(12) United States Patent
Guimbard et al.

(10) Patent No.: US 7,527,470 B2
(45) Date of Patent: May 5, 2009

(54) STATOR TURBINE VANE WITH IMPROVED COOLING

(75) Inventors: Jean-Michel Guimbard, Cely en Biere (FR); Philippe Pabion, Vaux le Penil (FR); Eric Schwartz, Seine Port (FR)

(73) Assignee: Snecma, Paris (FR)

( * ) Notice: Subject to any disclaimer, the term of this patent is extended or adjusted under 35 U.S.C. 154(b) by 636 days.

(21) Appl. No.: 11/168,985

(22) Filed: Jun. 29, 2005

(65) Prior Publication Data
US 2006/0233644 A1 Oct. 19, 2006

(30) Foreign Application Priority Data
Jun. 30, 2004 (FR) .................................. 04 07256

(51) Int. Cl.
*F01D 25/12* (2006.01)
(52) U.S. Cl. ....................................................... 415/115
(58) Field of Classification Search ................. 415/115; 416/96 A, 224, 97 R
See application file for complete search history.

(56) References Cited

U.S. PATENT DOCUMENTS

| 2,879,028 | A | * | 3/1959 | Stalker | 416/90 R |
| 3,301,527 | A | * | 1/1967 | Kercher | 415/115 |
| 4,288,201 | A | | 9/1981 | Wilson | |
| 4,292,008 | A | * | 9/1981 | Grosjean et al. | 415/115 |
| 4,946,346 | A | | 8/1990 | Ito | |
| 5,630,700 | A | | 5/1997 | Olsen et al. | |
| 6,193,465 | B1 | * | 2/2001 | Liotta et al. | 416/96 A |

FOREIGN PATENT DOCUMENTS

FR 2094033 A 2/1972

* cited by examiner

*Primary Examiner*—Ninh H Nguyen
(74) *Attorney, Agent, or Firm*—Rothwell, Figg, Ernst & Manbeck, PC

(57) ABSTRACT

A turbomachine stator vane having a leading edge, a trailing edge, and pressure side and suction side faces, a first and a second series of a plurality of holes, calibrated emission holes, and a perforated open liner defining an annular cavity between an outside wall of the liner and an inside wall of the vane, an air opening for feeding cooling air to the inside of the liner, and an air exhaust opening for exhausting cooling air from the vane, the liner being secured to the vane at one end and being free at another end to slide along an inside edge of the vane under the effects of relative thermal expansion between the liner and the inside wall of the vane. The holes through the liner in the second series of holes are disposed to avoid any impact of the cooling air against the bridges of the vane.

5 Claims, 3 Drawing Sheets

STATOR TURBINE VANE WITH IMPROVED COOLING

FIELD OF THE INVENTION

The present invention relates to the general field of turbine vanes for turbo-machinery, and more particularly to stator turbine vanes fitted with integrated cooling circuits.

PRIOR ART

In known manner, a turbomachine has a combustion chamber in which air and fuel are mixed prior to being burnt therein. The gas coming from such combustion flows downstream from the combustion chamber and then feeds a high pressure turbine, and then a low pressure turbine. Each turbine has one or more stator-vane rows (also known as nozzles) alternating with one or more moving-blade rows (also known as rotor disks), the rows being spaced circumferentially all around the rotor of the turbine. These turbine vanes are subjected to the very high temperatures of the combustion gas which can reach values well above those that the vanes in direct contact with the gas can withstand without damage, which has the consequence of limiting their lifetime.

In order to solve this problem, it is known to provide such vanes with internal cooling circuits seeking to reduce their temperature by creating an organized flow of air inside each vane and by providing perforations through the wall of the vane for the purpose of generating a protective film over the vane.

FIGS. 4 and 5 show a conventional cooled stator vane structure of the type including an open liner as presently fitted to the nozzles of certain airplane engines.

The vane 10 comprises a hollow airfoil 12 extending between an outer platform 14 and an inner platform 16, and it contains an inner liner 18 which defines an annular peripheral cavity 20 between the inside wall of the airfoil and the outside of the liner. At its top end 18A the liner is secured in leaktight manner to the outer platform of the vane by welding or brazing, and its bottom portion 18B is engaged in the inner platform of the vane via a guide zone or slideway 16A leaving a determined amount of clearance, as is required for assembly purposes and also to allow the liner to slide under the effects of thermal expansion. Studs 22 secured to the inside wall or formed by bosses on the liner maintain constant spacing between the liner and the inside wall, and bridges 23 stiffen the vane in the remaining portion of the cavity 20.

The open liner 18 is of the multiply-perforated type so that the flow of cooling air delivered by a source of air under pressure, generally the compressor of the turbomachine, penetrates into the outer platform 14 via an inlet orifice 24, reaches the inside of the liner 18, and has a fraction thereof escape through the multiple perforations of the liner so as to from jets of air in the peripheral cavity 20 that cool the inside wall of the airfoil 12 by impact and that also impact against the bridges 23, after which the air is evacuated through calibrated holes 26 formed in the trailing edge or in the pressure side face of the airfoil, so as to form a protective film of air along said trailing edge. The remainder of the cooling air flow leaves via the inner platform 16 which it cools as it passes therethrough, and escapes via an outlet orifice 28 to the outside of the vane, towards other members of the engine that also need cooling, such as the disks.

Overall, that conventional structure gives satisfaction. Nevertheless, the fact that the air is calibrated by the holes through the liner and indirectly by the leakage section leads to cooling of the airfoil that is less efficient. In addition, large variations appear locally in the temperature gradient over the wall of the vane, in particular in the vicinity of the leading edge, and these variations lead to radial stresses which, under extreme conditions of use, turn out to be harmful to the operation of the vane.

OBJECT AND SUMMARY OF THE INVENTION

The invention thus seeks to mitigate the drawbacks associated with these large variations in temperature gradient by proposing a turbomachine stator vane cooled by an open liner, in which the radial stresses acting on the vane are considerably reduced. The invention also relates to an entire turbomachine turbine fitted with such stator vanes cooled by open liners.

To this end, the invention provides a turbomachine stator vane having a leading edge, a trailing edge, and pressure side and suction side faces, and including a perforated open liner defining an annular cavity between an outside wall of the liner and an inside wall of the vane, an air admission opening for feeding cooling air to the inside of the liner, and an air exhaust opening for exhausting a fraction of this cooling air out from the vane, the liner being secured to the vane at one end and being free at another end to slide along an inside edge of the vane under the effects of relative thermal expansion between the liner and the inside wall of the vane, wherein said open liner includes a plurality of holes distributed over only two determined zones of said liner, a first series of holes being disposed facing the holes being disposed facing the inside wall of the trailing edge, the holes through the liner in the second series of holes also being disposed in such a manner as to avoid any impact against the bridges of the vane.

As a result, by contributing to cooling at the leading and trailing edges of the vane and by limiting impacts against the bridges, local temperature gradients are greatly reduced as are the axial stress levels on the airfoil.

Advantageously, each of said first and second series of holes comprises no more than three rows of holes in the liner, and typically a single row of holes in the liner.

Preferably, said second series of holes is disposed in such a manner as to define a shortest-path line between the liner and said inside wall of the trailing edge. In the intended configuration, said second series of holes may be disposed in such a manner as to define a shortest-path line between the liner and calibrated emission holes formed through said pressure side face in order to form a protective film of air all along the trailing edge.

BRIEF DESCRIPTION OF THE DRAWINGS

Other characteristics and advantages of the present invention appear from the following description made with reference to the accompanying drawings which show an embodiment of the invention having no limiting character and in which.

DETAILED DESCRIPTION OF AN EMBODIMENT

Figure 1:
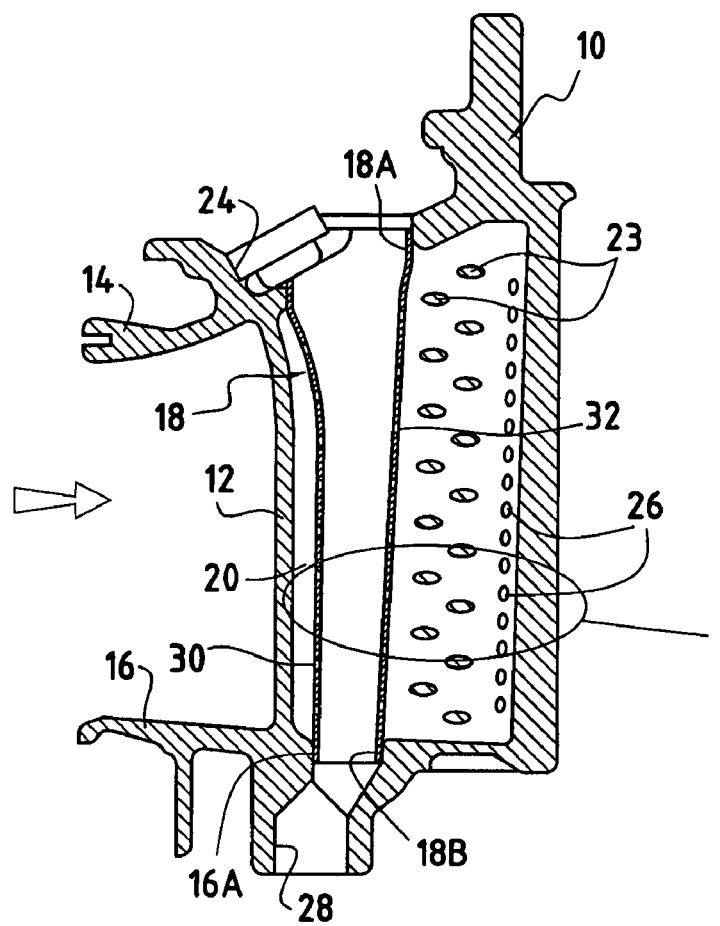
FIG. 1 is a longitudinal section view of a stator vane of the invention for a turbine nozzle.
Figure 2:
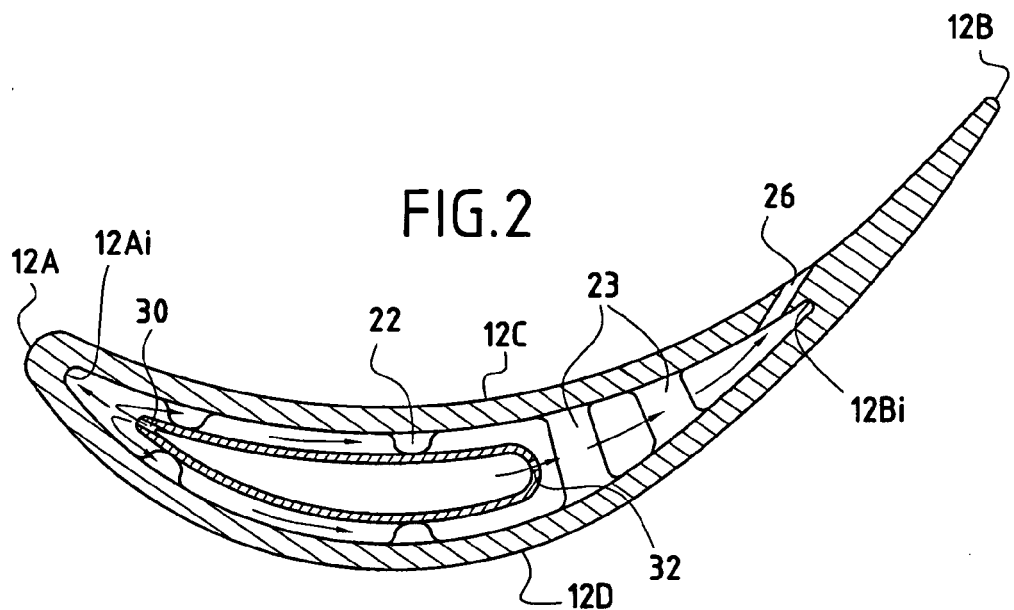
FIG. 2 is a cross-section view of the FIG. 1 vane.

FIGS. 1 and 2 show a cooled vane 10, e.g. a stator vane for a turbomachine turbine nozzle in accordance with the present invention. The vane comprises a hollow airfoil 12 mounted between an outer platform 14 and an inner platform 16 and it is secured to a casing (not shown) of the turbine via the outer platform which defines an outer wall for the stream of combustion gas flowing through the turbine, the inner wall of the flowing stream being defined by the inner platform of the vane.

Conventionally, with respect to the direction of flow of combustion gas as represented by an arrow in FIG. 1, the vane is said to have a leading edge 12A and a trailing edge 12B, together with a pressure side face 12C and a suction side face 12D.

Such a stator vane is subjected to the very high temperatures of combustion gas and therefore needs to be cooled. For this purpose, and in conventional manner, the vane 10 includes at least one perforated open liner 18 fed with cooling air via one of its radial ends, and serving to define an annular peripheral cavity 20 between the inside wall of the vane and the outside wall of the liner. At its top portion 18A, the liner is secured in leaktight manner to the outer platform 14 of the vane by welding or brazing, and at its bottom portion 18B, it is engaged in the inner platform 16 of the vane via a guide or sliding zone 16A leaving an annular space creating defined clearance as is needed both for assembly purposes and also to allow the liner to slide in operation, given the different ways in which the temperatures of these various components of the vane vary and thus given their expansion relative to one another, and also providing a leakage zone for the cooling air, which also, after passing through the liner, is exhausted via the calibrated emission holes 26 formed through the pressure side face of the airfoil so as to form a protective film of air along the trailing edge 12B. Air admission and air exhaust openings 24 and 28 are provided through the outer and inner platforms respectively so as to enable cooling air to be circulated.

According to the invention, the holes through the liner are concentrated in two particular zones for which sensitivity to the hot combustion gases flowing in the combustion gas stream is preponderant, i.e. those zones of the liner that face respectively the leading edge and the trailing edge of the airfoil.

As shown in FIG. 2, the leading edge 12A is cooled by jets of air leaving a first series of holes 30 in the liner, placed facing the inside wall 12Ai of this leading edge, thereby cooling this internal zone of the airfoil by impact. This first series of holes advantageously comprises a single row of holes.

Figure 1A:
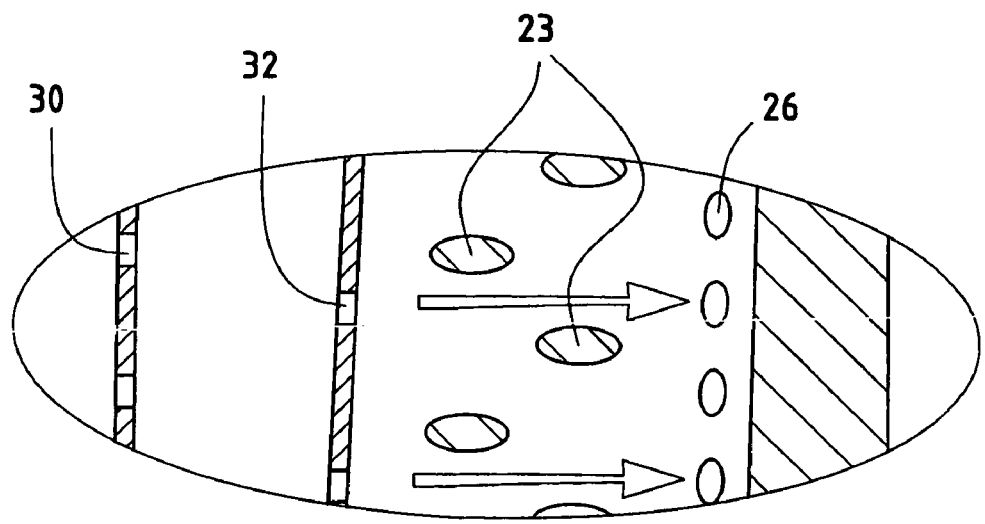
FIG. 1A is an enlarged view of a portion of FIG. 1.

The trailing edge 12B is cooled via calibrated emission holes 26 fed by the air jets leaving through the second series of holes 32 in the liner placed substantially facing the inside wall 12Bi of the trailing edge, and thus cooling the inside wall of the airfoil in said zone by impact. This second series of holes also advantageously comprises a single row of holes. More precisely, as shown in the detail of FIG. 1A, these holes are placed in such a manner as to form the shortest path between the liner 18 and the calibrated emission holes 26 and to avoid any impact with the inside wall of the vane at the bridges 23 in the vane. Thus, the air passing through the calibrated emission holes is relatively cool since only that portion of the air jet leaving through the first series of holes 30 has become heated in contact with the hot inner wall at the leading edge and over the pressure side and suction side faces, while the remainder of the air comes from air jets leaving directly via the second series of holes 32 that have not been subjected to heating because they do not impact against the inside wall or the bridges prior to reaching the calibrated emission holes.

Figure 3:
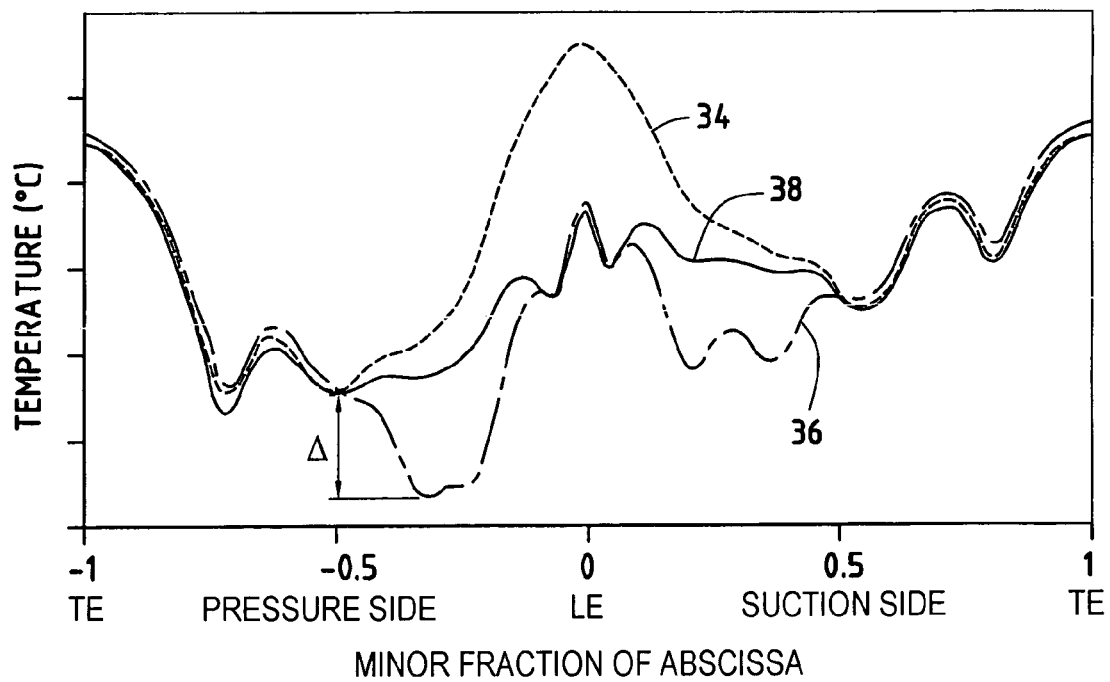
FIG. 3 is a graph plotting variation in temperature on the outer portion of the FIG. 2 vane.
Figure 4:
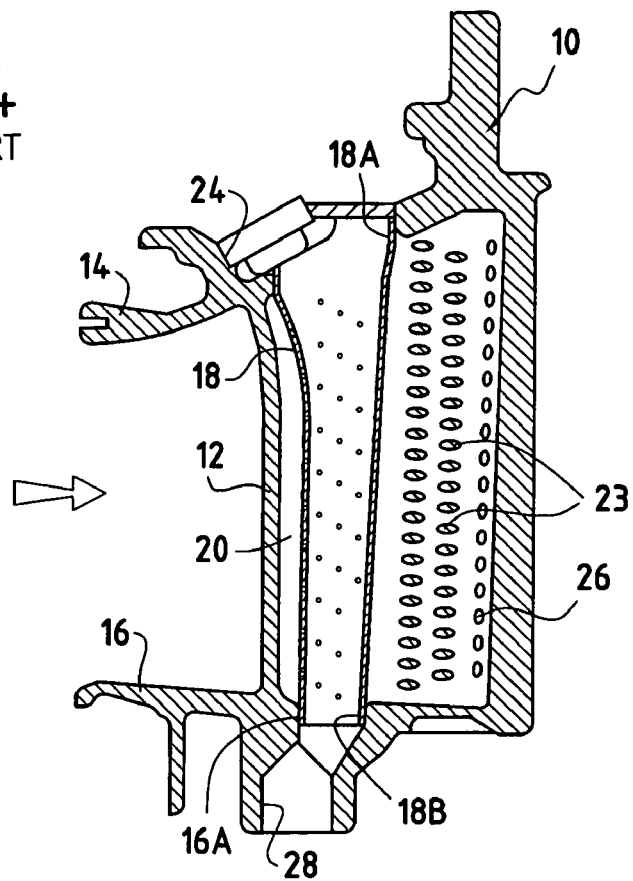
FIGS. 4 and 5 are two perpendicular sections through a prior art stator vane for a turbine nozzle.
Figure 5:
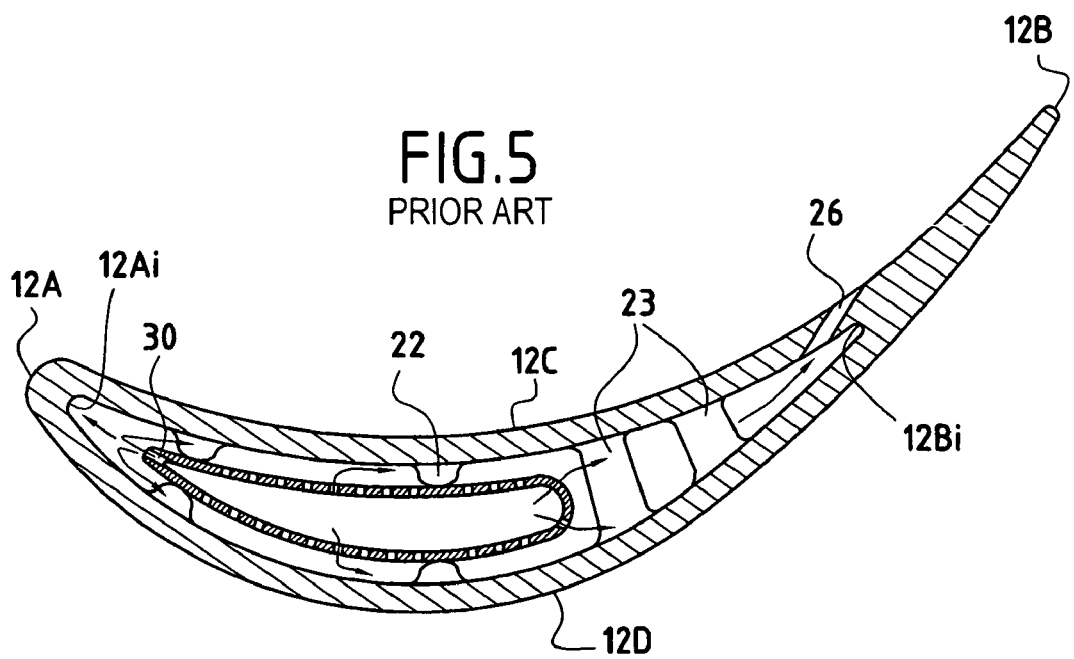

The contributions of the invention on temperature variations are shown in FIG. 3 which is a development of a radial section formed in the middle of the gas stream, i.e. where the combustion gas temperature is at its highest, in a low pressure nozzle stator vane of the kind shown in FIGS. 1 and 2.

The first curve 34 corresponds to a theoretical configuration in which the number of holes through the liner is very small and consequently in which practically all of the cooling flow passes via the leak that exists between the liner and the inner platform (i.e. an equivalent section for the holes of the liner much smaller than the leakage section). It can thus be seen that in this extreme configuration, only the wall in the vicinity of the trailing edge is cooled properly, the wall in the vicinity of the leading edge being cooled almost not at all. As a result the temperature in this location is very close to the temperature of the combustion gas and therefore exceeds the limit that the material can accept.

The second curve 36 corresponds to a prior art configuration in which the holes through the liner are distributed over the entire surface of the liner. In this configuration, the leading edge is properly cooled to a temperature below the breaking limit of the airfoil, but there can still be seen differences that are very large in terms of temperature gradients that are harmful to the strength of the vane because of the local stresses that are generated, and that are therefore harmful to its lifetime.

In contrast, with the present invention (third curve 38 drawn as a continuous line) these differences are significantly reduced, and they are accompanied by a temperature improvement of a few degrees at the leading edge and at the trailing edge, typically of the order of 4° C. to 8° C. In addition, on either side of the leading edge, over a distance equal to no more than half the distance that exists between the leading edge and the trailing edge (i.e. over a minor fraction of the abscissa <0.5), a very significant improvement can be obtained on the temperature gradient of the vane. More precisely, an improvement Δ has been observed that may be as much as 60° C. for the temperature gradient over the pressure side face for a minor fraction of the abscissa axis lying in the range 0.2 to 0.4.

Thus, with the holes through the liner in this configuration, the portions that were excessively cooled in the prior art are hotter and the portions that were insufficiently cooled are cooled to a greater extent. This provides better equilibrium in terms of temperature gradients. Naturally, although the description is given essentially in terms of a stator vane for a turbomachine turbine, it is clear that such a stator vane structure cooled by an open liner could be applied without difficulty to a stator of a turbomachine compressor and indeed to an arm of a turbomachine casing.

What is claimed is:

1. A turbomachine stator vane having a leading edge, a trailing edge, and pressure side and suction side faces, and including a perforated open liner defining an annular cavity between an outside wall of the liner and an inside wall of the vane, an air admission opening for feeding cooling air to the inside of the liner, and an air exhaust opening for exhausting a fraction of this cooling air out from the vane, the liner being secured to the vane at one end and being free at another end to slide along an inside edge of the vane under the effects of relative thermal expansion between the liner and the inside wall of the vane, wherein said open liner includes a plurality of holes distributed over only two determined zones of said liner, a first series of holes being disposed facing the inside wall of the leading edge and a second series of holes being disposed facing calibrated emission holes formed in the trailing edge through said pressure side face, the holes through the liner in the second series of holes also being disposed in such a manner as to avoid any impact of the cooling air against the bridges of the vane.

2. A vane according to claim 1, wherein each of said first and second series of holes comprises one to three rows of holes through the liner.

3. A vane according to claim 2, wherein said second series of holes is disposed in such a manner as to define a shortest-path line between the liner and said inside wall of the trailing edge.

4. A vane according to claim 2, wherein said second series of holes is disposed in such a manner as to define a shortest-path line between the liner and said calibrated emission holes formed in order to form a protective film of air along said trailing edge.

5. A turbomachine turbine, including a plurality of stator vanes cooled by respective open liners according to claim 1.

* * * * *